(12) United States Patent
Shimazawa et al.

(10) Patent No.: US 10,742,540 B2
(45) Date of Patent: Aug. 11, 2020

(54) CLOUD RELAY SYSTEM AND RELAY SERVER

(71) Applicant: WingArc1st Inc., Tokyo (JP)

(72) Inventors: Ko Shimazawa, Tokyo (JP); Hironori Watanabe, Tokyo (JP)

(73) Assignee: WingArc1st Inc., Tokyo (JP)

( * ) Notice: Subject to any disclaimer, the term of this patent is extended or adjusted under 35 U.S.C. 154(b) by 0 days.

(21) Appl. No.: 15/880,880

(22) Filed: Jan. 26, 2018

(65) Prior Publication Data

US 2018/0241662 A1    Aug. 23, 2018

(51) Int. Cl.
*H04L 12/707*    (2013.01)
*G06F 12/08*    (2016.01)
*H04L 29/08*    (2006.01)
*H04L 12/703*    (2013.01)

(52) U.S. Cl.
CPC .............. *H04L 45/22* (2013.01); *H04L 45/28* (2013.01); *H04L 67/10* (2013.01)

(58) Field of Classification Search
CPC ...................................................... H04L 45/22
See application file for complete search history.

(56) References Cited

U.S. PATENT DOCUMENTS

| | | | |
|---|---|---|---|
| 9,137,097 B1* | 9/2015 | Reynolds | H04L 41/0654 |
| 2002/0112075 A1* | 8/2002 | Takashimizu | G06F 11/0757 |
| | | | 709/244 |
| 2002/0118398 A1* | 8/2002 | Tanimoto | H04L 29/06 |
| | | | 358/407 |
| 2008/0077657 A1* | 3/2008 | Tagami | G06F 11/2025 |
| | | | 709/203 |
| 2011/0072122 A1* | 3/2011 | Miller | G06F 11/1662 |
| | | | 709/223 |
| 2011/0289221 A1* | 11/2011 | Lowekamp | H04L 69/40 |
| | | | 709/227 |
| 2017/0228623 A1* | 8/2017 | Ono | G06F 3/121 |

FOREIGN PATENT DOCUMENTS

| | | |
|---|---|---|
| JP | 2002-300220 A | 10/2002 |
| JP | 2016-091314 A | 5/2016 |

* cited by examiner

*Primary Examiner* — Nicholas R Taylor
*Assistant Examiner* — Sanjoy Roy
(74) *Attorney, Agent, or Firm* — Polsinelli PC

(57) ABSTRACT

A connection from first terminal CL11, Cl12 to m of relay servers RS1 to RS4 is performed and a connection from second terminal CL21, CL22 to n thereof is performed to relay a communication between the terminals with one of the relay servers connected in common to both of the terminals set to be an active relay server. If a failure occurs in the active relay server, the other relay server connected in common to the first terminal and the second terminal is searched to relay a communication between the terminals with the relay server set to be an alternative relay server at the first terminal and the second terminal. Consequently, a data communication between the terminals is performed through the relay server selected optionally, and furthermore, adjustment for determining the alternative relay server is performed on the terminal side if a failure occurs in an active relay server.

7 Claims, 3 Drawing Sheets

CLOUD RELAY SYSTEM AND RELAY SERVER

CROSS REFERENCE TO RELATED APPLICATIONS

This application claims priority to Application No. 2017-029514 filed in Japan on Feb. 20, 2017 under 35 U.S.C. § 119. The entire contents of this application are hereby incorporated by reference.

FIELD OF THE INVENTION

The present invention relates to a cloud relay system and a relay server, and more particularly, is suitably used for a system for relaying a data communication between terminals by the relay server.

BACKGROUND OF THE INVENTION

In recent years, the practical configuration of cloud computing has widely been used in place of a former information system to be on-premises software. According to the cloud computing, an external resource such as a server farm connected to internet can be practically used on demand.

Referring to many configurations of the cloud computing, access is gained from a client terminal to a server through internet and a service offered from the server is received by the client terminal. In contrast, there is also a configuration in which terminals are connected to each other to perform a communication through internet. According to the latter configuration, data stored in a certain terminal can be processed in response to a request given from another terminal. For example, the server can acquire data from an internal terminal and process the data in response to a request given from an external terminal to the server, and provide a result of the data processing to an external terminal to be a request source.

There is also known a system of this type which can shorten a response time required for giving a request and then obtaining a result of a data processing (for example, see Japanese Laid-Open Patent Publication No. 2016-91314). Referring to the data processing system described in the Japanese Laid-Open Patent Publication No. 2016-91314, in place of the fact that original data required for executing a data processing responding to a request is transmitted from another terminal to a server when the server receives a request related to a data processing from a terminal, the request is transmitted to another terminal to execute the data processing so that the server receives a result of the data processing executed at the another terminal and provides the result to a terminal of a request source. Consequently, a data volume to be transmitted from another terminal to the server can be reduced to shorten a time required for the data transmission.

As an example of the configuration for connecting terminals to perform a communication, furthermore, there is known a communicating system which is intended for enabling implement communication from internet to a network device in a local system beyond fire wall or a communication between network devices in different local systems beyond fire wall and normally enabling identification of each connection even if there is a plurality of connections between respective network apparatuses and relay servers (for example, see Japanese Laid-Open Patent Publication No. 2002-300220).

Referring to the communicating system described in the Japanese Laid-Open Patent Publication No. 2002-300220, when a first terminal in a certain local system logs in to a relay server, a unique connection identifier is given and returned to a first connection at that time. When a second terminal in another local system logs in to a relay server, similarly, a unique connection identifier is given to a second connection at that time and is returned. A communication between the first terminal and the second terminal is implemented by relaying a communication using a first connection to which a connection identifier between the relay server and the first terminal is given and a communication using a second connection to which a connection identifier between the relay server and the second terminal is given respectively in the relay server.

SUMMARY OF THE INVENTION

Also in both the Japanese Laid-Open Patent Publications Nos. 2016-91314 and the Japanese Laid-Open Patent Publication No. 2002-300220, however, there is a problem in that a communication between terminals cannot be performed continuously if a failure occurs in a server for relaying the communication between the terminals so that the server cannot be operated. In order to avoid this problem, generally, the server is made redundant. To make redundant implies that a preliminary server is arranged and operated as backup for a normal period in order to continuously maintain a function of the whole system also after some failure occurs to prepare for the case in which some failure occurs in the server.

In order to construct and operate a system in which a server is made redundant, generally, it is necessary to provide a standby server for backup in addition to a normal active server and to share information by the active server and the standby server. In this case, however, there is a problem in that a processing responding to a request given from the terminal concentrates on the active server, resulting in an increase in a load, while a resource of the standby server cannot be used effectively. In order to share the information by the active server and the standby server, moreover, there is a problem in that a processing for usually copying and saving information retained in the active server into the standby server is required and a processing load thereof is further applied.

The present invention has been made to solve these problems and has an object to enable a communication between terminals to be continuously performed even if a failure occurs in a server used for relay without requiring to share information between servers while effectively using a resource of each server made redundant to perform a load distribution.

In order to attain the object, a cloud relay system according to the present invention includes a plurality of relay servers and a plurality of terminals, and a connection is performed from a first terminal to m (m≥2) relay servers and a connection is performed from a second terminal to n (n≥2) relay servers, one of the relay servers connected in common to the first terminal and the second terminal is set to be an active relay server to relay a communication between the first terminal and the active relay server and a communication between the second terminal and the active relay server, thereby performing a data communication between the terminals. When a failure occurs in the active relay server, the other relay server connected in common to the first terminal and the second terminal is searched and is set to be an alternative relay server at the first terminal and the second terminal, and a communication between the first terminal and the alternative relay server and a communication between the second terminal and the alternative relay server are relayed to perform a data communication between the terminals.

According to the present invention having the structure described above, the data communication between the terminals is performed through an optionally selected one of the relay servers which are made redundant. Also when the data communication between the terminals is performed in a plurality of combinations, therefore, the relay servers are operated as the active relay servers for the data communication. Consequently, it is possible to perform a load distribution by effectively using a resource of each relay server without load concentration on only one of the relay servers. In the case in which a failure occurs in the active relay server, moreover, use of the other relay server as an alternative relay server is adjusted at the terminal side. Therefore, it is possible to continuously perform the data communication between the terminals even if a failure occurs in the relay server used for relaying the data communication without requiring to share information between the relay servers.

DETAILED DESCRIPTION OF PREFERRED EMBODIMENTS

First Embodiment

Figure 1:
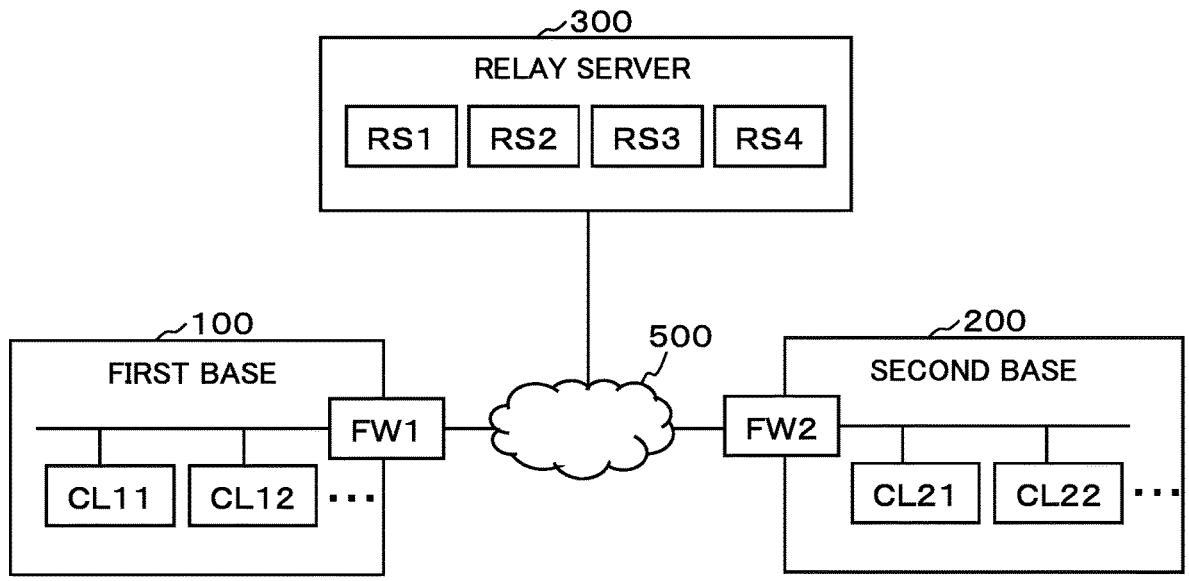
FIG. 1 is a diagram showing an example of a structure of a cloud relay system according to a first embodiment.

An embodiment according to the present invention will be described with reference to the drawings. FIG. 1 is a diagram showing an example of a structure of a cloud relay system according to a first embodiment. The cloud relay system according to the first embodiment has the structure in which a relay server 300 relays a data communication between any of terminals CL11, CL12, . . . in a first base 100 and any of terminals CL21, CL22, . . . in a second base 200. The first base 100, the second base 200 and the third base 300 are connected through a communication network 500 such as internet.

A fire wall FW1 is provided in the first base 100 to block a connection from an outside to the terminals CL11, CL12. In other words, when a connection request is given from the terminals CL21, CL22 in the second base 200, it is rejected by the fire wall FW1. However, a connection request from the terminals CL11, CL12 in the first base 100 to the relay server 300 on the outside passes through the fire wall FW1. If a connection is once established between the terminals CL11, CL12 and the relay server 300, a data communication can be performed mutually between the terminals CL11, CL12 and the relay server 300.

Similarly, a fire wall FW2 is provided in the second base 200 to block a connection from the outside to the terminals CL21, CL22. In other words, when a connection request is given from the terminals CL11, CL12 in the first base 100, it is rejected by the fire wall FW2. However, a connection request from the terminals CL21, CL22 in the second base 200 to the relay server 300 on the outside passes through the fire wall FW2. If a connection is once established between the terminals CL21, CL22 and the relay server 300, a data communication can be performed mutually between the terminals CL21, CL22 and the relay server 300.

More specifically, in the cloud relay system according to the first embodiment, the relay server 300 relays the data communication between the terminals CL11, CL12 in the first base 100 and the relay server 300 and the data communication between the terminals CL21, CL22 in the second base 200 and the relay server 300. Consequently, a data communication can be performed between the terminals CL11, CL12 in the first base 100 and the terminals CL21, CL22 in the second base 200.

In the first embodiment, there are provided relay servers RS1 to RS4. These relay servers RS1 to RS4 are independent each other and all of them serve as active relay servers. In other words, only one of them and the others are not used as an active server and standby servers but all the relay servers RS1 to RS4 can be active relay servers for the terminals CL11, CL12, CL21, CL22. Moreover, the relay servers RS1 to RS4 do not share mutual information. In other words, none of the relay servers RS1 to TS4 performs a processing for usually copying and saving information retained by itself into the other servers.

In the first embodiment, there is performed a connection from the first terminal in the terminals CL11, CL12, . . . in the first base 100 to m (m≥2) relay servers in the relay servers RS1 to RS4. Moreover, there is performed a connection from the second terminal in the terminals CL21, CL22, . . . in the second base 200 to n (n≥2) relay servers in the relay servers RS1 to RS4.

Thus, one of features of the present embodiment is that the first terminal and the relay servers are not connected with one to one but one to m (m≥2) and the second terminal and the relay servers are not connected with one to one but one to n ((n≥2). m may be equal to n and m may be unequal to n. Each of the relay servers RS1 to RS4 stores connection information indicating which terminal is connected to itself.

Which one of the relay servers RS1 to RS4 is connected to the first terminal is determined optionally in the relay server 300. In other words, when a connection request is given from the first terminal to the relay server 300, the relay server 300 optionally selects and connects any of the relay servers RS1 to RS4. For example, the relay server 300 includes a load balancer (not shown) and any of the relay servers which has a small load can be selected and connected when a connection request is given. Alternatively, any of the relay servers may be selected randomly. When a connection request is given from the second terminal, the same processing is performed.

In the relay server 300, one of the relay servers RS1 to RS4 which are connected in common to the first terminal in the first base 100 and the second terminal in the second base 200 is set to be an active relay server to relay a communication between the first terminal and the active relay server and a communication between the second terminal and the active relay server, thereby performing a data communication between the terminals.

Figure 2:
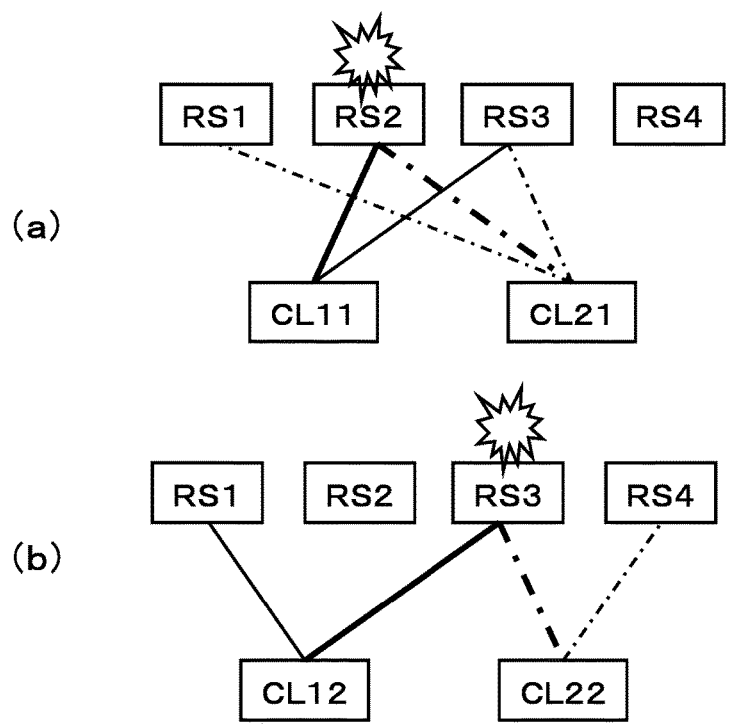
FIG. 2 is a diagram showing an example of a connecting relationship in a data communication between terminals which is to be performed through a relay server.

FIG. 2 is a diagram showing an example of a connecting relationship in the data communication between the terminals which is to be performed through the relay server 300. FIG. 2(a) is a diagram showing the connecting relationship of the data communication to be performed on the assumption that the first terminal is the terminal CL11 in the first base 100 and the second terminal is the terminal CL21 in the second base 200. FIG. 2(b) is a diagram showing a connecting relationship of a data communication to be performed on the assumption that the first terminal is the terminal CL12 in the first base 100 and the second terminal is the terminal CL22 in the second base 200.

In the example of FIG. 2(a), the first terminal CL11 is connected to two relay servers RS2 and RS3. Moreover, the second terminal CL21 is connected to three relay servers RS1 to RS3. In this case, two of the relay servers RS1 to RS4, that is, the relay serves RS2 and RS3 are connected in common to the first terminal CL11 and the second terminal CL21. In this case, either of the relay servers RS2 and RS3 (for example, RS2) is set to be an active relay server to relay a communication between the first terminal CL11 and the active relay server RS2 and a communication between the second terminal CL21 and the active relay server RS2, thereby performing a data communication between the terminals CL11 and CL21.

In the case in which a plurality of relay servers is connected in common, which one of the relay servers RS2 and RS3 is used as the active relay server is determined optionally in the relay server 300. For example, the relay server 300 includes a load balancer (not shown) and can select any of the relay servers which has a small load and determine the relay server as the active relay server. Alternatively, any of the relay servers may be selected randomly.

In an example of FIG. 2(b), the first terminal CL12 is connected to two relay servers RS1 and RS3. Moreover, the second terminal CL22 is connected to two relay servers RS3 and RS4. In this case, only the relay server RS3 is connected in common to the first terminal CL12 and the second terminal CL22. In this case, the relay server RS3 is set to be an active relay server to relay a communication between the first terminal CL12 and the active relay server RS3 and a communication between the second terminal CL22 and the active relay server RS3, thereby performing a data communication between the terminals CL12 and CL22.

As an example of the data communication, the following processing can be executed. More specifically, a data processing request is transmitted from one of the terminals to the other terminal and a processing corresponding to the request is executed for data retained in an inner part of the other terminal, and data on an execution result is returned to one of the terminals which is a request source. According to the first embodiment, it is possible to remotely control one of the terminals from the other terminal to acquire necessary data from the terminal through the other terminal without constructing VPN (Virtual Private Network) or drawing an exclusive line between the first base 100 and the second base 200.

As described above, in the first embodiment, the active relay server is varied depending on the combination of the two terminals which perform the data communication. In other words, the relay server RS2 is used as the active relay server when the data communication is performed between the terminals CL11 and CL21 as shown in FIG. 2(a), and the relay server RS3 is used as the active relay server when the data communication is performed between the terminals CL12 and CL22 as shown in FIG. 2(b). In other words, all the relay servers RS1 to RS4 can be operated as the active relay servers at the same time.

In the case in which a failure occurs in the active relay server determined as described above, the other relay server connected in common to the first terminal and the second terminal is searched and set to be an alternative relay server at the first terminal and the second terminal to relay a communication between the first terminal and the alternative relay server and a communication between the second terminal and the alternative relay server, thereby performing a data communication between the terminals.

For instance, in the example of FIG. 2(a), it is assumed that a failure occurs in the relay server RS2 which is being operated as the active relay server in relation to the data communication between the terminals CL11 and CL21. When the failure occurs in the relay server RS2, a response is not returned to an action transmitted from the first terminal CL11 to the relay server RS2. Therefore, it is possible to detect, at the first terminal CL11, the occurrence of some failure in the relay server RS2. Similarly, it is also possible to detect, at the second terminal CL21, the occurrence of some failure in the relay server RS2.

In this case, at the first terminal CL11 and the second terminal CL21, the other relay server RS3 connected in common thereto is searched and set to be an alternative relay server. More specifically, a request is preferentially transmitted from a terminal of a request transmission source in the first terminal CL11 and the second terminal CL21 to a relay server to which itself has already been connected. Consequently, the other relay server to which a terminal of a request transmission destination has already been connected is searched and the other relay server thus searched is determined as an alternative relay server.

For example, it is assumed that the first terminal CL11 is a terminal of a request transmission source and the second terminal CL21 is a terminal of a request transmission destination. In this case, the first terminal CL11 of the request transmission source transmits a data communication request addressed to the second terminal CL21 to the other relay server RS3 to which itself is connected in addition to the relay server RS2 in which a failure occurs. In this case, since the relay server RS3 stores, as connecting information, that it is connected to the second terminal CL21, it accepts a request. Consequently, the first terminal CL11 of the request transmission source can find the other relay server RS3 to which the second terminal CL21 to be the request transmission destination has already been connected.

In the relay server 300, the other relay server RS3 thus searched is determined as an alternative relay server to relay a communication between the first terminal CL11 and the alternative relay server RS3 and a communication between the second terminal CL21 and the alternative relay server RS3, thereby performing a data communication between the terminals CL11 and CL21. Even if a failure occurs in the relay server RS2 which is being operated as an active relay server, consequently, it is possible to continuously perform the data communication between the terminals CL11 and CL21 by setting the other relay server RS3 as the alternative relay server.

It is assumed that the second terminal CL21 is the terminal of the request transmission source and the first terminal CL11 is the terminal of the request transmission destination. In this case, the second terminal CL21 of the request transmission source transmits a data communication request addressed to the first terminal CL11 to the other relay server RS1 to which itself is connected in addition to the relay server RS2 where the failure occurs. In this case, since the relay server RS1 does not store a connection to the first terminal CL11 as connecting information, it rejects the request and gives a notice to the second terminal CL21.

The second terminal CL21 receiving the notice of the request rejection transmits a data communication request addressed to the first terminal CL11 to another relay server RS3 to which itself is connected. In this case, since the relay server RS3 stores a connection to the first terminal CL11 as connecting information, it accepts the request. Consequently, the second terminal CL21 of the request transmission source can find the other relay server RS3 to which the first terminal CL11 of the request transmission destination has already been connected.

In the example of FIG. 2(b), moreover, it is assumed that a failure occurs in the relay server RS3 which is being operated as an active relay server in relation to the data communication between the terminals CL12 and CL22. In this case, in the first terminal CL12 and the second terminal CL22, the other relay server connected in common thereto is searched and cannot be found. In other words, in the case in which the first terminal CL12 serves as the terminal of the request transmission source, it receives a notice of request rejection from the other relay server RS1 to which itself is connected. In the case in which the second terminal CL22 serves as the terminal of the request transmission source, furthermore, it receives the notice of the request rejection from the other relay server RS4 to which itself is connected.

In this case, an additional connection is executed for the relay server 300 from the terminal of the request transmission source. For example, in the case in which the first terminal CL12 is the terminal of the request transmission source and receives the notice of the request rejection from the other relay server RS1 to which itself is connected, the first terminal CL12 gives a connection request to either or both of the other relay servers RS2 and RS4 and performs a connection. Herein, if the first terminal CL12 and the relay server RS4 are connected to each other, a request addressed to the second terminal CL22 is accepted from the first terminal CL12. Accordingly, it is possible to continuously perform the data communication between the terminals CL12 and CL22 by setting the relay server RS4 as an alternative relay server.

Figure 3:
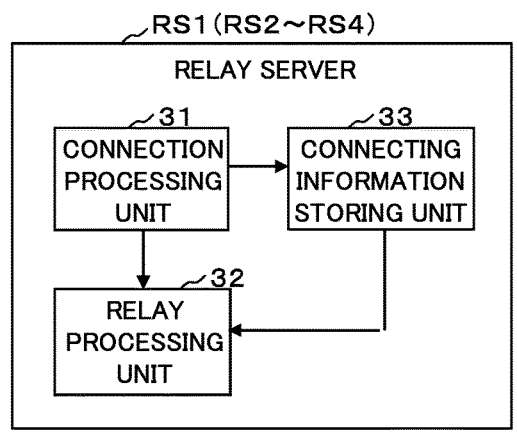
FIG. 3 is a diagram showing an example of a functional structure according to the first embodiment.

FIG. 3 is a diagram showing an example of functional structures of the relay servers RS1 to RS4 for enabling the data communication described above. All the relay servers RS1 to RS4 have the functional structures shown in FIG. 3. As shown in FIG. 3, the relay servers RS1 to RS4 according to the first embodiment include a connection processing unit 31 and a relay processing unit 32 as the functional structures. Moreover, the relay servers RS1 to RS4 include a connecting information storing unit 33 as a storage medium.

The function blocks 31 and 32 can be configured by any of hardware, DSP (Digital Signal Processor) and software. For example, in the case in which they are configured by software, the respective function blocks 31 and 32 actually include a CPU, an RAM, an ROM and the like in a computer and are implemented by an operation of a program stored in a recording medium such as an RAM, an ROM, a hard disk, a semiconductor memory or the like.

The connection processing unit 31 accepts a connection request given from i (i≥1) terminals among a plurality of terminals (the terminals CL11, CL12, . . . in the first base 100 and the terminals CL21, Cl22, . . . in the second base 200) to connect the communications together with the i terminals, respectively. For example, in case of FIG. 2(a), the connection processing unit 31 of the relay server RS2 accepts connection requests given from the terminal CL11 in the first base 100 and the terminal CL21 in the second base 200 to connect communications together with these two terminals CL11 and CL21, respectively.

A connecting information storing unit 33 stores information about a terminal connected by the connection processing unit 31. In other words, the connecting information storing unit 33 stores connecting information indicating which terminal is set into a connecting state between the connection processing unit 31. In case of the example shown in FIG. 2(a), the connecting information recording unit 33 of the relay server RS2 stores connecting information indicating that a connecting state to the terminal CL11 in the first base 100 and the terminal CL21 in the second base 200 is set.

The relay processing unit 32 relays a communication connected to the first terminal in the i terminals connected by the connection processing unit 31 and a communication connected to the second terminal in the i terminals, thereby performing a data communication between the first terminal and the second terminal. In case of the example shown in FIG. 2(a), the relay processing unit 32 of the relay server RS2 relays a communication connected to the first terminal CL11 in the first base 100 and a communication connected to the second terminal CL21 in the second base 200, thereby performing a data communication between the first terminal CL11 and the second terminal CL21.

In the case in which a failure occurs in the other relay server, moreover, the relay processing unit 32 further relays a communication between the terminals which is performed by the other relay server when one of the terminals connected to the other relay server is included in the i terminals. With the example shown in FIG. 2(a), in the case in which a failure occurs in the other relay server RS2, both of the terminals CL11 and CL21 connected to the other relay server RS2 are included in the i terminals CL11 and CL21 connected to the relay server RS3. In this case, accordingly, the relay processing unit 32 of the relay server RS3 takes over and relays a communication between the terminals CL11 and CL21 which is performed by the other relay server RS2.

With the example shown in FIG. 2(b), furthermore, in the case in which a failure occurs in the other relay server RS3, for example, one of the terminals CL12 and CL22 connected to the other relay server RS3, that is, the terminal CL22 is included in the i terminal CL22 connected to the relay server RS4. In this case, accordingly, the relay processing unit 32 of the relay server RS4 accepts an additional connection from the first terminal CL12 to the relay server RS4 and then takes over and relays a communication between the terminals CL21 and CL22 which is performed by the other relay server RS3.

As described above in detail, according to the first embodiment, a data communication between the terminals is performed through any of the relay servers RS1 to RS4 made redundant which is optionally selected. Also when the data communication between the terminals is performed in a plurality of combinations as shown in FIG. 2(a) or 2(b), therefore, the relay servers RS2 and RS3 are operated as active relay servers of the data communications. In some cases in which the data communication between the terminals is performed in combinations other than FIGS. 2(a) and 2(b), the other relay servers RS1 and RS4 may be also operated as the active relay servers.

Consequently, a load does not concentrate on only one relay server but it is possible to perform a load distribution by effectively using a resource of each of the relay servers RS1 to RS4. In the case in which a failure occurs in the active relay server, moreover, the use of the other relay servers as alternative relay servers is adjusted on the terminal side. Therefore, it is possible to continuously perform the data communication between the terminals even if a failure occurs in the relay server used for relaying the data communication without requiring to share the connecting information or the like between the relay servers RS1 to RS4. Moreover, it is not necessary to perform a processing for copying and sharing information between the relay servers RS1 to RS4. Therefore, it is possible to easily perform additional construction of a relay server if necessary.

Second Embodiment

Figure 4:
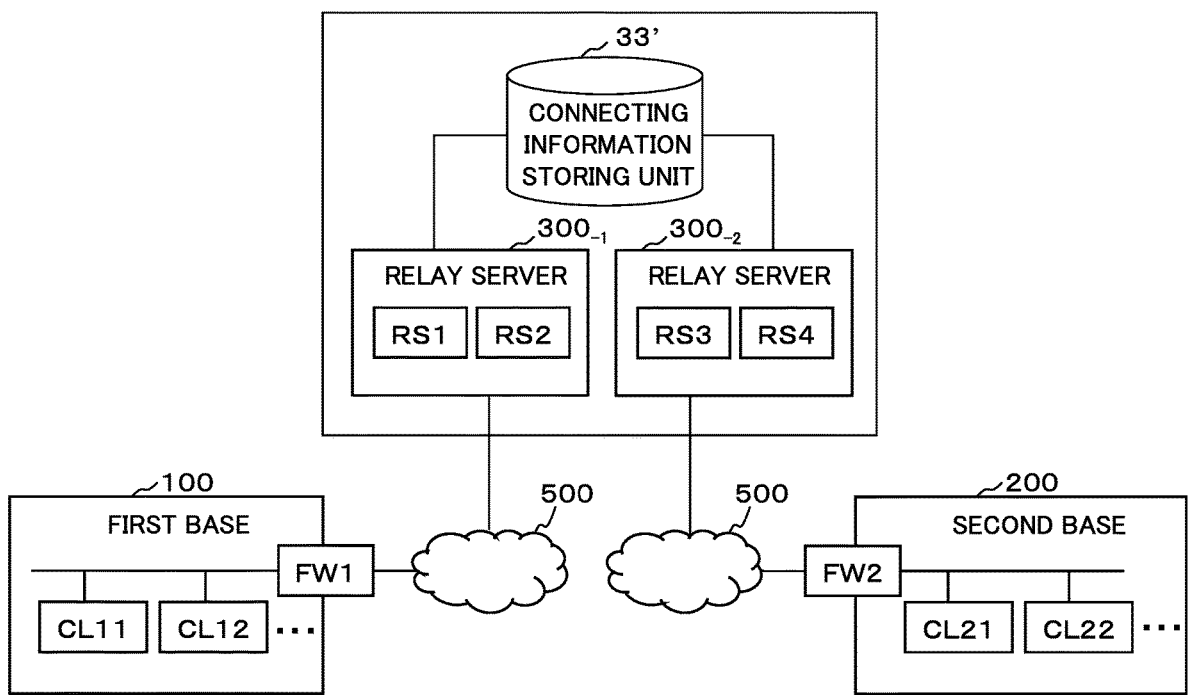
FIG. 4 is a diagram showing an example of a structure of a cloud relay system according to a second embodiment.

Next, a second embodiment according to the present invention will be described with reference to the drawings. FIG. 4 is a diagram showing an example of a structure of a cloud relay system according to the second embodiment. In FIG. 4, components having the same reference numerals as those shown in FIG. 1 have the same functions, and therefore, repetitive explanation will be omitted.

In the second embodiment, there are provided a relay server $300_{-1}$ for a first base 100 and a relay server $300_{-2}$ for a second base 200. Apart of the relay servers RS1 to RS4, that is, the relay servers RS1 and RS2 are included in the relay server $300_{-1}$ for the first base 100. The other part of the relay servers RS1 to RS4, that is, the relay servers RS3 and RS4 are included in the relay server $300_{-2}$ for the second base 200.

In the second embodiment, terminals CL11, CL12, . . . in the first base 100 connect at least one of the relay servers RS1 and RS2 for the first base 100 and at least one of the terminals RS3 and RS4 for the second base 200. The terminals CL21, CL22, . . . in the second base 200 also connect at least one of the relay servers RS1 and RS2 for the first base 100 and at least one of the relay servers RS3 and RS4 for the second base 200.

In the second embodiment, moreover, connecting information indicative of a connecting relationship between the terminals CL11, CL12, CL21, CL22 and the relay servers RS1 to RS4 are stored in a connecting information storing unit 33' which can be accessed from both the relay server $300_{-1}$ for the first base 100 and the relay server $300_{-2}$ for the second base 200 in common. More specifically, in the second embodiment, the connecting information storing unit 33' is provided in place of the connecting information storing unit 33 shown in FIG. 3.

In case of a structure shown in FIG. 4, the relay servers $300_{-1}$ and $300_{-2}$ (each of the relay servers RS1 to RS4) can be caused to have a function for performing a desirable data processing in response to requests given from the terminals CL11, CL12, CL21, CL22 as well as a data communication relay function.

For example, the relay servers RS1 to RS4 can be caused to have a function of a BI (Business Intelligence) tool for analyzing data in a company to be accumulated from a business system or the like. More specifically, the relay servers RS1 to RS4 mount software referred to as a dashboard for a configuration of the BI tool. The dashboard has a main function for acquiring various data surrounding the company from the internal terminals CL1, CL12, CL21, CL22 and carrying out collection and calculation, performing a processing into a chart, a graph and the like and displaying them.

For instance, it is assumed that the first base 100 is a head office of a company and the second base 200 is a factory of the company. In this case, the relay servers RS1, RS2 for the first base 100 perform a processing for analyzing data related to the business of the head office and the like by using data stored in the terminals CL11, CL12 of the head office. A result of the data processing is stored in the terminals CL11, CL12 of the head office. Moreover, the relay servers RS3, RS4 for the second base 200 perform a processing for analyzing data related to the business of the factory and the like by using data stored in the terminals CL21, CL22 of the factory. A result of the data processing is stored in the terminals CL21, CL22 of the factory.

In this case, when analytical data of the factory is required in the head office, for example, it is possible to remotely control the terminals CL21, CL22 of the factory from the terminals CL11, CL12 of the head office, thereby acquiring a result obtained by analysis in the relay server $300_{-2}$ (any of the relay servers RS3 and RS4) by using the data of the terminals CL21, CL22 of the factory at the terminals CL11, CL12 of the head office through the relay server $300_{-2}$ from the terminals CL21, CL22 of the factory. It is also possible to remotely control the relay server $300_{-2}$ from the terminals CL11, CL12 in the head office, thereby causing the terminals CL21, CL22 of the factory to execute a data processing in response to a command sent from the relay server $300_{-2}$ to acquire a result of the execution from the terminals CL21, CL22 of the factory through the relay server $300_{-2}$.

In the second embodiment, a processing to be performed when a failure occurs in an active relay server can be the same as that in the first embodiment. In other words, in the case in which a failure occurs in the active relay server, a request is transmitted from a terminal of a request transmission source at the first terminal and the second terminal and another relay server connected in common to a terminal of a request transmission destination is searched and is set to be an alternative relay server, and a communication between the first terminal and the alternative relay server and a communication between the second terminal and the alternative relay server are relayed to perform a data communication between the terminals.

In this case, when the relay server transmitted a request from the terminal of the request transmission source is not connected to the terminal of the request transmission destination, it is necessary to change the relay server and transmit the request again and to repeat this processing until the relay server connected to the terminal of the request transmission destination is found. In contrast, in the second embodiment, there is provided the connecting information storing unit 33' which can be accessed in common from the relay servers RS1 to RS4. By utilizing the connecting information storing unit 33', a notice of the relay server connected in common to the terminal of the request transmission source and that of the request transmission destination may be given from the relay server side to the terminal side.

In other words, in the case in which a failure occurs in an active relay server and a request addressed to a terminal of a request transmission destination is then transmitted from a terminal of a request transmission source to any of the relay servers, the relay server receiving the request refers to the connecting information stored in the connecting information storing unit 33' to judge whether it is connected to the terminal of the request transmission destination or not. Here, if it is determined that it is not connected, the relay server receiving the request refers to the connecting information stored in the connecting information storing unit 33' to search the other relay server to which the terminal of the request transmission destination has already been connected, thereby giving a notice of the other relay server thus searched to the terminal of the request transmission source when the relay server receiving the request is not connected to the terminal of the request transmission destination.

For example, in a state in which the connecting relationship shown in FIG. 2(a) is set, it is assumed that a failure occurs in the active relay server RS2 relaying the data communication with the first terminal CL11 and the second terminal CL21 and a request addressed to the first terminal CL11 is then transmitted from the second terminal CL21 to the other relay server RS1. In this case, the relay server RS1 does not store, as connecting information, that the relay server RS1 is connected to the first terminal CL11. In this case, in the first embodiment, a notice of request rejection is given to the second terminal CL21.

In contrast, in the second embodiment, the relay server RS1 receiving a request addressed to the first terminal CL11 searches the other relay server RS3 to which the first terminal CL11 of the request transmission destination has already been connected with reference to the connecting information stored in the connecting information storing unit 33' and gives a notice of the other relay server RS3 thus searched to the second terminal CL21 of the request transmission source. In this case, the other relay server RS3 thus given with the notice is set to be an alternative relay server, thereby relaying a communication between the first terminal CL11 and the alternative relay server RS3 and a communication between the second terminal CL21 and the alternative relay server RS3 to perform a data communication between the terminals CL11 and CL21.

Consequently, it is possible to efficiently search the other relay server RS3 connected in common to the first terminal CL11 and the second terminal CL21 and to determine the other relay server RS3 as an alternative relay server. Thus, it is possible to switch the relay server more smoothly.

Figure 5:
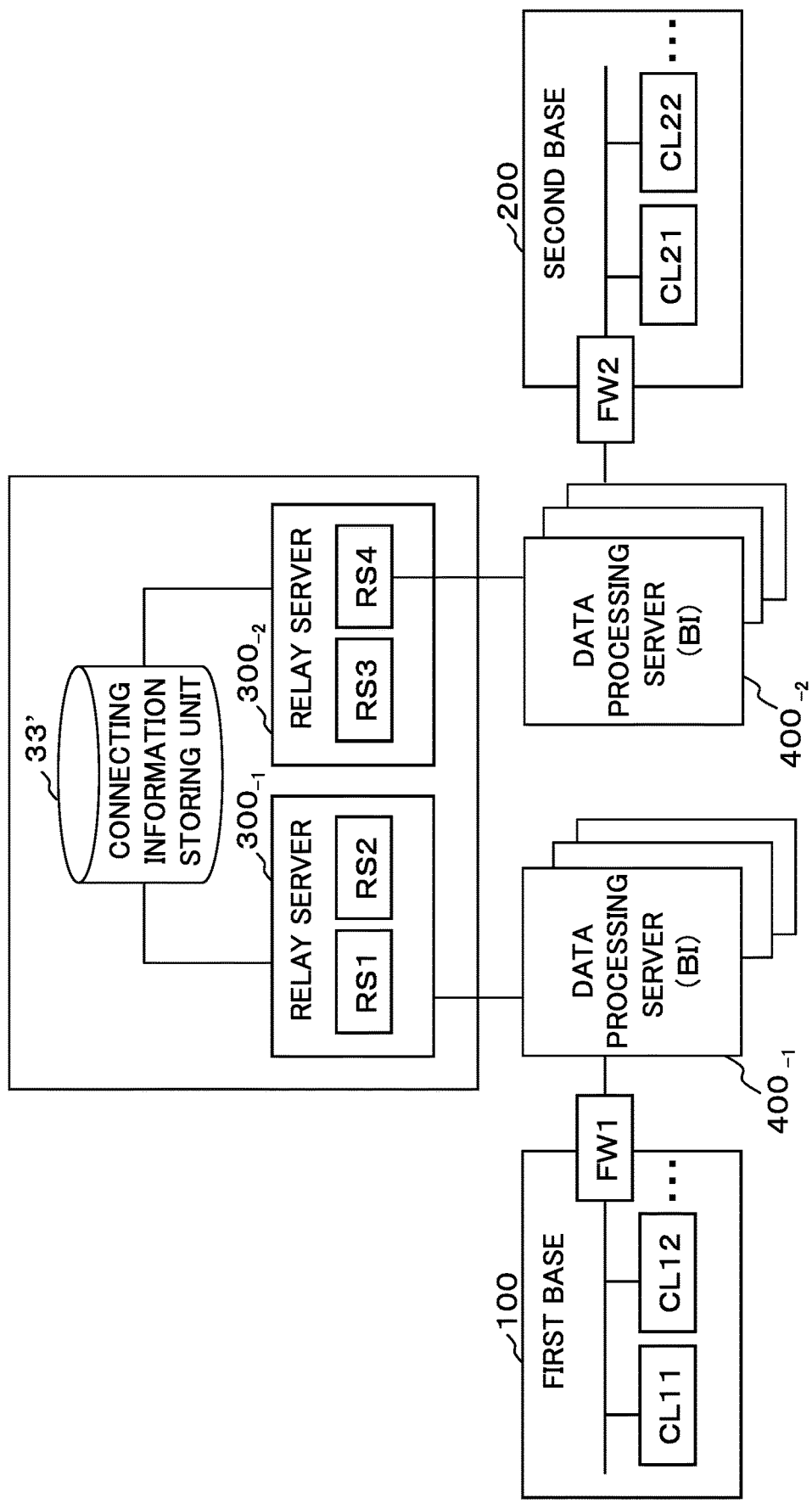
FIG. 5 is a diagram showing another example of the structure of the cloud relay system according to the second embodiment.

While the description has been given to the example in which the relay servers RS1 to RS4 are caused to have a data processing function such as a BI tool in the second embodiments, the present invention is not restricted thereto. For example, as shown in FIG. 5, servers $400_{-1}$ and $400_{-2}$ for performing a data processing such as a BI tool may be provided separately from the relay servers $300_{-1}$ and $300_{-2}$. In this case, a redundancy structure may be employed for the data processing servers $400_{-1}$ and $400_{-2}$.

Although the description has been given to the example in which two bases are provided in the first and second embodiments, moreover, the present invention can be similarly applied to the case in which three bases or more are provided.

In addition, the first and second embodiments are only illustrative for concreteness to carry out the present invention and the technical scope of the present invention should not be thereby construed to be restrictive. In other words, the present invention can be carried out in various configurations without departing from the gist or main features thereof.

The invention claimed is:

1. A cloud relay system for relaying a data communication between terminals by a relay server, comprising:
    a plurality of relay servers comprising at least three relay servers which are not subject to a processing for mutually sharing connection information with the terminals, and a plurality of terminals,
    wherein a connection is performed from a first terminal in the plurality of terminals to m (m≥2) relay servers selected from the plurality of relay servers and a connection is performed from a second terminal in the plurality of terminals to n (n≥2) relay servers selected from the plurality of relay servers,
    one relay server selected from at least one server connected in common to the first terminal and the second terminal, among the m relay servers to which the first terminal is connected and the n relay servers to which the second terminal is connected, is set to be an active relay server to relay a communication between the first terminal and the active relay server and a communication between the second terminal and the active relay server, thereby performing a data communication between the terminals, and
    when a failure occurs in the active relay server, in response to a request from a terminal of a request transmission source in one of the first terminal and the second terminal to a relay server which is not the active relay server and to which the terminal of the request transmission source has already been connected, the other relay server connected in common to the terminal of the request transmission source and a terminal of a request transmission destination is searched and is set to be an alternative relay server, and a communication between the first terminal and the alternative relay server and a communication between the second terminal and the alternative relay server are relayed to perform a data communication between the terminals.

2. The cloud relay system according to claim 1, wherein when a failure occurs in the active relay server, the other relay server to which a terminal of a request transmission destination has already been connected is searched from a terminal of a request transmission source in one of the first terminal and the second terminal and the other relay server thus searched is set to be the alternative relay server to relay a communication between the first terminal and the alternative relay server and a communication between the second terminal and the alternative relay server, thereby performing a data communication between the terminals.

3. The cloud relay system according to claim 2, wherein each of the relay servers includes a connecting information storing unit for storing connecting information indicating which terminal is set to a connecting state to itself, and
    when a request addressed to a terminal of the request transmission destination is transmitted from the terminal of the request transmission source to the other relay server, if the other relay server receiving the request confirms that a connection between the other relay server and the terminal of the request transmission destination is also performed by referring to the connecting information stored in the connecting information storing unit, the other relay server receiving the request is set to be the alternative relay server to perform a data communication between the terminals.

4. The cloud relay system according to claim 1 further comprising a connecting information storing unit for storing connecting information indicative of a connecting situation of the plurality of relay servers and the plurality of terminals,
    wherein when a failure occurs in the active relay server and a request addressed to a terminal of a request transmission destination is then transmitted from a terminal of a request transmission source in one of the first terminal and the second terminal to some relay server, if the relay server receiving the request is not connected to the terminal of the request transmission destination, the relay server receiving the request searches the other relay server to which the terminal of the request transmission destination has already been connected by referring to the connecting information stored in the connecting information storing unit, and gives a notice of the other relay server thus searched to the terminal of the request transmission source, thereby using the other relay server thus given with the notice as the alternative relay server and relaying a communication between the first terminal and the alternative relay server and a communication between the second terminal and the alternative relay server to perform a data communication between the terminals.

5. A relay server to be used for a cloud relay system according to claim 1, comprising:
 a connection processing unit for accepting a connection request given from i (i≥1) terminals in a plurality of terminals and connecting communications between the i terminals, respectively; and
 a relay processing unit that is configured to relay, when the first terminal and the second terminal are included in the i terminals in which communications are connected by the connection processing unit and the relay server is determined to operate as the active relay server which relays a communication between the first terminal and the second terminal, a communication connected to the first terminal and a communication connected to the second terminal, thereby performing a data communication between the first terminal and the second terminal,
 wherein the relay processing unit further determines whether a terminal of a request transmission destination is included in the i terminals, in response to a request from a terminal of a request transmission source which is one of the terminals connected to the other relay server, when a failure occurs in the other relay server, and if it is determined that the terminal of the request transmission destination is included, the relay processing unit is set to be an alternative relay server in place of the other relay server to further relay a communication between terminals performed by the other relay server.

6. The relay server according to claim 5, further comprising a connecting information storing unit for storing connecting information indicating which terminal is set into a connecting state to itself,
 wherein when the relay processing unit receives a request addressed to a terminal of a request transmission destination from a terminal of the request transmission source in any of the terminals connected to the other relay server after a failure occurs in the other relay server, the relay processing unit further relays a communication between the terminals if it is confirmed that a connection to the terminal of the request transmission destination is also performed referring to the connecting information stored in the connecting information storing unit.

7. The relay server according to claim 5, further comprising a connecting information storing unit for storing connecting information indicative of a connecting situation to the plurality of relay servers and the plurality of terminals,
 wherein when the relay processing unit receives a request addressed to a terminal of a request transmission destination from a terminal of a request transmission source in any of the terminals connected to the other relay server after a failure occurs in the other relay server, in case of a non-connection to the terminal of the request transmission destination, the relay processing unit searches a further other relay server to which the terminal of the request transmission destination has already been connected with reference to the connecting information stored in the connecting information storing unit and gives a notice of the further other relay server thus searched to the terminal of the request transmission source.

* * * * *